(No Model.)
W. BUTLER.
THRASHING MACHINE.
No. 477,507. Patented June 21, 1892.
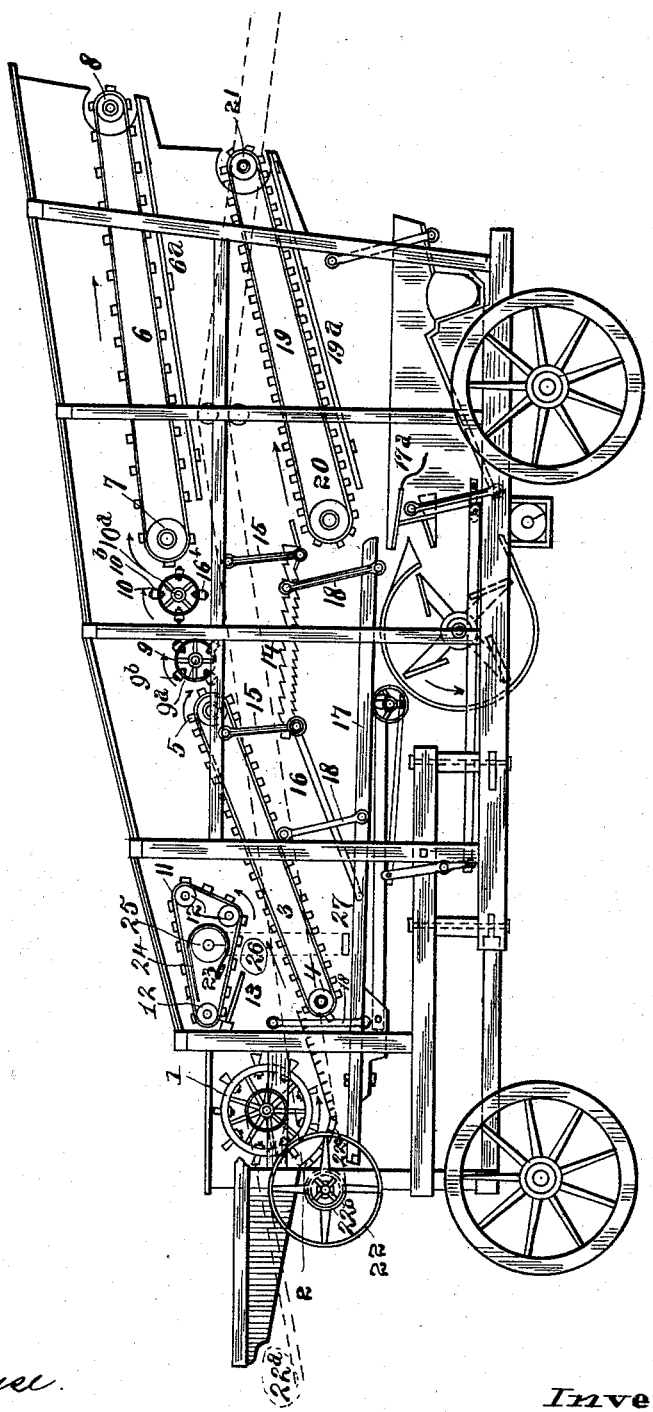
Attest
George E. Cruse
Harry D. Rohrer
Inventor:
Wesley Butler
By Knight Bros
att'ys

UNITED STATES PATENT OFFICE.

WESLEY BUTLER, OF LITCHFIELD, ILLINOIS.

THRASHING-MACHINE.

SPECIFICATION forming part of Letters Patent No. 477,507, dated June 21, 1892.

Application filed October 12, 1891. Serial No. 408,473. (No model.)

*To all whom it may concern:*

Be it known that I, WESLEY BUTLER, of Litchfield, in the county of Montgomery and State of Illinois, have invented a certain new and useful Improvement in Thrashing-Machines, of which the following is a full, clear, and exact description, reference being had to the accompanying drawing, forming part of this specification.

My invention relates to certain improvements in the beaters of a thrashing-machine and to the carriers and certain other parts; and it consists in features of novelty hereinafter fully described, and pointed out in the claims.

The drawing represents a side elevation of my improved machine, the side boarding of the machine being removed.

The frame of the machine, with its cylinder 1 and concave 2, may be of ordinary construction.

3 is an endless straw-carrier placed near the front end of the machine and running on rollers 4 and 5.

6 is an endless straw-carrier at the rear end of the machine running on rollers 7 and 8.

Between the two carriers 3 and 6 are two rotary beaters 9 and 10, which consist of wheels or disks on shafts $9^a$ and $10^a$, connected by slats $9^b$ and $10^b$, running parallel with the shafts. Above the carrier 3 is an endless beater consisting of belts 11, provided with slats running transversely to the belts, said belts running upon rollers 12, arranged in the form of a triangle. The body of the thrashed straw and grain as it leaves the cylinder 1 passes between the carrier 3 and the beater 11, the grain dropping between the slats of the carrier, while the straw passes on and is carried over the beaters 9 and 10 and the carrier 6. The grain drops onto the swinging pan 17 and is discharged into the cleaner-shoe $17^a$, as usual.

13 represents a comb having fingers placed a short distance apart extending across the machine and just below the endless beater 11, which fingers point in a downwardly direction and direct the straw down upon the carrier 3. The grain projected violently from the cylinder 1 may pass between the fingers of the comb, and some of it may pass between the slats of the endless beater 11 and enter the mouth 23 of a case 24 within the beater, in which case turns a rotary spiral conveyer 25, that carries the grain to a chute or chutes 26 at the side of the machine, through which the grain descends and is discharged from the spout 27 upon the vibrating pan 17. It is preferred that the conveyer 25 should be right and left hand, so as to carry the grain from the middle to both sides of the machine, in which case there would be two chutes 26, carrying the grain to the pan.

14 represents a shaker suspended by links 15 and oscillated through means of a bar 16, pivoted to a pan 17, which conveyer-pan is suspended by links 18. Motion is given to the conveyer-pan by any suitable means, which need not be here explained, as it does not appertain to my present invention.

19 is an endless straw-carrier running on rollers 20 and 21, that receives the short straw, &c., dropping through the carrier 6, and after separating the grain therefrom, carries the straw, &c., to the straw elevator or stacker, the grain being carried backward on the inclined board $19^a$ and dropped into the cleaner-shoe $17^a$. The slats of the carrier 19 should be placed a smaller distance asunder than the slats of the carrier 6, as the former carries shorter material and in smaller quantity.

22 is a pulley located at the forward end of the machine and which acts as a tightener to to the belt by which the cylinder 1 is driven. This belt is shown by dotted lines $22^a$. The lower part of the belt runs over the top of the pulley 22, so as to drive the pulley by friction.

$22^b$ is a pulley fast upon the shaft of the pulley 22, carrying a belt $22^c$, (shown by dotted lines,) by which the mechanism of the sweeping straw elevator or stacker is driven. By "sweeping straw-stacker" is meant the stacker having a straw-carrier turning from side to side in a horizontal plane. The device is well known, and needs no special description. Thus it will be seen that the sweeping straw-elevator is not driven from the threshing mechanism, and consequently the obstruction of wind or accumulations of straw, while checking the motion of the straw-stacker, will not interfere with the steady running of the thrashing mechanism. This is regarded as very important, because for perfect performance the threshing mechanism must be run at a high and regular speed, and as many of the pulleys are small an extra strain, such as is liable to occur from connection with a straw-stacker thrown upon the belt, would cause the slipping of belts on the pulleys. By the provision of the pulley 22 this is obviated.

It has been said that the slats upon the carrier 6 are placed farther apart upon their belts than those of the carrier 19. The object of this arrangement is that the long straw is carried out from the carrier 6, and the slats do not in this case require to be very close together; but the carrier 19, being designed to carry the short straw-blades and chaff, the slats require to be closer together on this account. It will be seen that by this arrangement I am able to produce a double separation of the grain from the straw, as the long straw passes out on the carrier 6, and any grain that may be carried out upon this carrier falls upon the board 6ᵃ beneath the carrier and is carried back into the machine, which is also the case with the carrier 19, that carries out the short straw, &c.

The operation of my improved machine is as follows: The grain enters in the usual manner and the straw passes up the carrier 3, where it is agitated between the carrier 3 and the endless beater, and it then passes off of the carrier onto the rotary beaters 9 and 10, where any loose grain in the straw is shaken out, after which the straw passes out on the carrier 6, while the grain, with more or less of the chaff, short straw, and blades, drops on the board 6ᵃ and is carried back by the lower part of the conveyer 6. The main part of the grain of course is dropped onto the pan 17 from the straw-carrier 3, while part drops on the shaker 14. The matter dropping from the board 6ᵃ is separated by the carrier 19, while the matter dropping from the board 19ᵃ goes into the cleaner-shoe 17ᵃ.

I claim as my invention—

1. In a thrashing-machine, the combination of the thrashing-cylinder 1, the open endless beater arranged contiguous to or in close proximity to the cylinder, whereby it is adapted to receive the impact of the matter projected from the cylinder, and an open-mouthed case within the endless beater, substantially as set forth.

2. The combination, in a thrashing-machine, of the thrashing-cylinder 1, the open endless beater 11, located in close proximity to the cylinder to receive the impact of matter projected by the cylinder, the open-mouthed case 24 within the beater 11, and the spiral conveyer 25 and chutes 26, substantially as and for the purpose set forth.

3. The combination, in a thrashing-machine, of the thrashing-cylinder 1, the comb 13, the open endless beater 11, which projects over the comb, the open-mouthed case 24, the spiral conveyer 25, and chutes 26, substantially as and for the purpose set forth.

4. In a thrashing-machine, the combination of the carrier 3, comb 13 above the carrier, open-mouthed case 24 above the comb, the mouth of the case being adjacent to the comb, and an open beater operating in connection with and outside of the case, substantially as and for the purpose set forth.

5. The combination, in a thrashing-machine, of a pulley 22, adapted to act as a tightener to the drive-belt of the thrashing-cylinder, a belt-pulley on the shaft of pulley 22, and a belt passing over the belt-pulley and connected with the drive mechanism of a straw-stacker, whereby the latter is operated by means of the frictional contact of pulley 22 with the drive-belt of the thrasher, substantially as and for the purpose set forth.

WESLEY BUTLER.

In presence of—
JOHN H. HOOD,
E. S. KNIGHT.